United States Patent [19]

Brown et al.

[11] 4,387,639
[45] Jun. 14, 1983

[54] MULTI-FUNCTION FINANCIAL DOCUMENT PROCESSOR

[75] Inventors: Charles R. Brown, Rosendale, N.Y.; Theodore J. Kohne, Uithoorn, Netherlands; Donald C. Lancto, Charlotte, N.C.

[73] Assignee: International Business Machines Corporation, Armonk, N.Y.

[21] Appl. No.: 280,723

[22] Filed: Jul. 6, 1981

Related U.S. Application Data

[63] Continuation of Ser. No. 83,494, Oct. 10, 1979, abandoned.

[51] Int. Cl.³ .............................................. B41L 47/46
[52] U.S. Cl. ............................................. 101/2; 101/91
[58] Field of Search ........................... 101/2, 90, 91, 92; 271/184, 185; 414/134; 209/11, 11.5

[56] References Cited

U.S. PATENT DOCUMENTS

| | | | |
|---|---|---|---|
| 3,532,337 | 10/1970 | Krantz | 271/185 X |
| 3,641,931 | 2/1972 | Hickox et al. | 101/2 X |
| 3,757,942 | 9/1973 | Gunn | 101/2 X |
| 3,769,906 | 11/1973 | Martin | 101/91 |
| 3,771,441 | 11/1973 | Wallace | 101/2 |
| 3,884,370 | 5/1975 | Bradshaw et al. | 414/134 |
| 3,934,717 | 1/1976 | Kataziri et al. | 271/185 X |
| 3,995,750 | 12/1976 | Carlson | 414/134 |
| 4,068,212 | 1/1978 | Templeton | 340/146.5 ED |
| 4,073,487 | 2/1978 | Schirrmeister | 271/64 |
| 4,082,945 | 4/1978 | van de Goor et al. | 235/419 |

FOREIGN PATENT DOCUMENTS

| | | |
|---|---|---|
| 1234629 | 2/1967 | Fed. Rep. of Germany . |
| 2336966 | 2/1975 | Fed. Rep. of Germany . |
| 2737854 | 3/1979 | Fed. Rep. of Germany . |
| 2357011 | 1/1978 | France . |
| 2372659 | 6/1978 | France . |

*Primary Examiner*—Edward M. Coven
*Attorney, Agent, or Firm*—Karl O. Hesse

[57] ABSTRACT

A multi-function document processor, including proof inscribing and sorting functions. The document feed station keyboard, and stacker are connected in such a fashion so as to allow easy access to each of these machine elements by an operator without leaving a seated position. The advantageously accessible arrangement of functional elements is achieved by a novel use of rotary document processing stations, resulting in a folded transport path of significantly shorter length, and a transition station for moving the documents from a first plane into a second plane for more compact stacker pocket orientation. Document travel through the improved transport and into the stacker pockets is controlled by logic in the form of a plurality of microprocessors communicating via an okay to send wire.

8 Claims, 11 Drawing Figures

MULTI-FUNCTION FINANCIAL DOCUMENT PROCESSOR

This application is a continuation of application Ser. No. 083,494, filed Oct. 10, 1979, abandoned.

BACKGROUND OF THE INVENTION

1. FIELD OF THE INVENTION

This invention relates to financial document proving, inscribing, and sorting systems and more particularly to an intelligent interactive computer terminal for accomplishing financial document processing.

2. DESCRIPTION OF THE PRIOR ART

Proof inscribing is one of the major elements of magnetic ink character recognition (MICR) check processing. Data used in the processing of checks are encoded in magnetic ink on the front bottom portion of checks and other documents in accordance with specifications provided by the American Bankers Association. The magnetic ink code line consists of multiple fields including the check routing and transit number to identify the bank and Federal Reserve district, the customer's account number, a process control field usually used to distinguish among the various "on us" items belonging to the bank where the account resides, and the dollar amount field. Most of the magnetic ink fields are preencoded on the check and the dollar amount field is entered at a keyboard by a proof inscriber operator. The proof inscribing function involves keying of the total deposit amount as written on the deposit ticket and then keying the amount as listed on the individual checks within that deposit. The amounts as keyed by the operator are encoded in the MICR code line of both the deposit ticket and the individual checks. The sum of the check amounts must equal the deposit ticket amount for the deposit to be in balance. Otherwise, the operator must determine the source of error and correct the deposit.

Two major types of proof inscribers, unit inscribers and distribution inscribers, are used. A unit inscriber has only one stacker pocket and the sequence of input documents is maintained through the proof inscribing operation and into the stacker. The deposit documents are then processed on an on-line multi-pocket high speed reader sorter such as the IBM 3890 or IBM 3895. The first pass on the reader sorter provides for capture of the MICR data as well as some distribution including separation of the on-us items to be processed against accounts maintained in the processing bank from transit items to be processed against accounts at other banks. Finer distribution of these items is accomplished by subsequent passes through the reader sorter.

A distribution inscriber combines some of the functions of a proof inscriber and a reader sorter. A distribution inscriber provides a first pass sort of items prior to on-line data capture for a computer. The deposit sequence is not maintained on a distribution inscriber. Instead, an initial distribution such as separation of on-us items from transit items is made. High dollar transit items can also be separated for expediting. Pocket selection is performed by the operator who depresses a key for the selected pocket number based upon the check routing and transit number read from the check by the operator.

Recently, on-line inscribers have become available. An on-line inscriber performs the functions currently done with off-line inscribers and in addition has the capability of reading the MICR code line and storing the data on a file such as a magnetic cassette or magnetic diskette for subsequent account posting. The sort pocket selection decision of an on-line distribution describer can be automatically made by the unit based upon the routing and transit numbers read from the MICR code line.

A major drawback of the prior art financial document processing machines is that, by virtue of mechanical transport design requirements, the essential elements of feed station, keyboard and a large number of stacker pockets are not conveniently accessible to a seated operator. Additionally, in the prior art, small banks and branches of larger banks often had to forward the paper documents to larger institutions for processing due to the lack of a conveniently operable small machine capable of performing the functions of proof inscribing and reading/sorting.

SUMMARY OF THE INVENTION

It is therefore an object of the present invention to provide a low cost, conveniently operable multi-function financial document processing machine.

It is a further object of this invention to provide a document processing machine having the capabilities of both an on-line data collecting distribution inscriber and a reader sorter.

These and other objects which will become apparent upon a reading of the detailed specifications are accomplished by providing an interactive keyboard terminal machine having a document feed station oriented at an angle to the keyboard, thereby allowing an operator to pick up documents in one hand for convenient reading while entering information therefrom at the keyboard with the other hand and dropping the document into a feed slot when the data to be read from the document has been entered. In order to provide convenient access to a plurality of the stacker pockets, documents enter the stacker at substantially 90 degrees to the rows of keyboard keys. Documents being stacked are in a substantially horizontal plane. In order to provide a conveniently short transport while at the same time providing adequate space for the multifunctions being executed within the transport, a rotary face in read station and a rotary print/endorse station are utilized, thereby simultaneously permitting these functions to be executed and change the direction of travel of the document in order to shorten the transport. When used in primarily a sort operation, a high speed transport path is provided which bypasses the slower speed requirements of the inscribing, printing, and endorsing stations, advantageously merging with the first document path at a point immediately prior to a transition station. The transition station moves the document from a first on-edge vertical plane which facilitates document path folding into a second plane having an orientation of between five and thirty five degrees from the horizontal for more efficient one on top of the other document stacking.

BRIEF DESCRIPTION OF THE DRAWINGS

FIG. 6B is a detail top view of the transport.

FIG. 7 shows how FIGS. 6A and 6B are to be joined.

DETAILED DESCRIPTION OF THE PREFERRED EMBODIMENT

Figure 1:
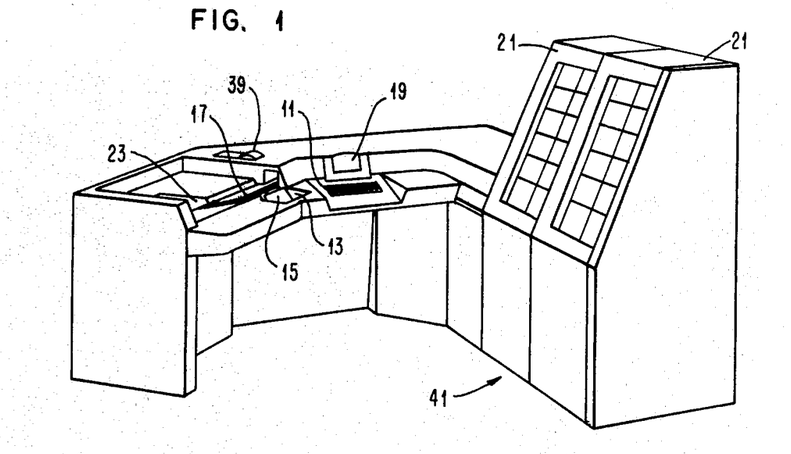
FIG. 1 is a perspective view of the overall machine.

Referring now to FIG. 1, a perspective view of the entire machine is shown. A keyboard 11 is centrally located for use by the operator's right hand. To the left of the keyboard is a well 13 in the tabletop for holding source documents 15 to be processed. Each document 15 is taken up in turn in the operator's left hand and information thereon is entered at keyboard 11. After information such as the amount field on the financial source document has been entered at keyboard 11, the document is dropped into manual feed slot 17 for processing by the machine. It has been found that forty five degrees with respect to a row of keys of the keyboard is an advantageous manual feed slot orientation. After being dropped into slot 17, sensors detect the presence of the document and close feed rollers, moving the document through the read station and through the hold and view station 19. If necessary, the computer may stop the document at the hold and view station for further action by the operator. Thereupon, the document is moved to stacker 21. When used as a sorter, an automatic feed station 23 is loaded with a group of documents for sorting. Documents are automatically fed from auto feed 23, through manual feed station 17, past a read station and into one of the pockets of stacker 21 as selected by the processor in response to information read from the respective financial document. A master list printer 39 is provided to the left rear of the hold and view station to print a master list of all documents processed and to provide printed output for operator interaction. Likewise, a plurality of pocket list printers housed under each stacker module provide a list of documents being forwarded for collection.

Figure 2:
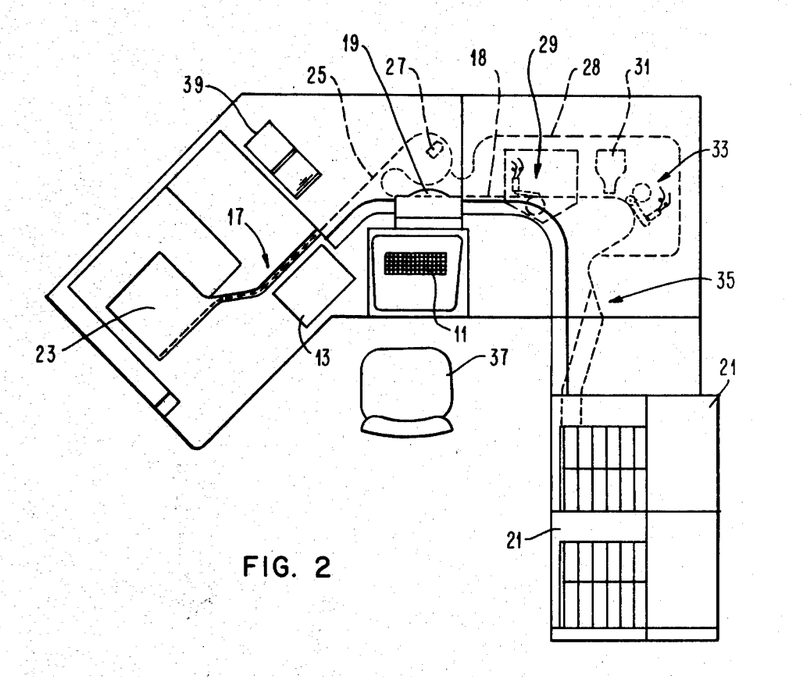
FIG. 2 is a plan view of the top covers showing location of the first and second document paths and major machine elements.

The operations of proof inscribing and sorting will again be described with reference to FIG. 2 in order to provide a better understanding of the overall machine in preparation for later detailed description. Again, document well 13 is shown from which source financial documents can be withdrawn and data thereon entered at keyboard 11. After the source data has been entered at keyboard 11, the source document is dropped into manual feed slot 17 from whence it is moved into the machine to the read station 27 following the path indicated by dotted line 25. Read station 27 includes a read head mounted under a read transport drum for reading the MICR field located at the bottom edge of the financial document. After passing read station 27, the document enters hold and view station 19 where it may be halted if necessary to allow the operator to enter information which could not be accurately read at read station 27. From hold and view station 19, the document proceeds along the slow speed print path 18 to inscribing station 29. Information such as the dollar amount of the financial document entered at keyboard 11 is inscribed in the MICR field at station 29. After being inscribed, the document will move past sequence printer 31 and endorser 33. After the document sequence number and the endorsement have been provided on the back of the financial document, the document proceeds toward transition station 35. Transition station 35 changes the document from a vertical on edge orientation which allows the transport path to be shortened, by folding at read station 27 and endorse station 33, to a more horizontal position for improved accessibility stacking. It has been found that an orientation of twenty five degrees up from horizontal is an advantageous stacking plane although other angles in the range of five to thirty five degrees are also possible. The advantageous arrangement of feed stations, keyboard and stacker are portrayed in relation to the operator's seated position represented by a chair 37.

When used as a sorter, documents to be sorted are loaded into autofeed 23 and moved through manual station 17 along path 25 to read station 27. After being read, the financial documents being sorted are diverted to high speed sort path 28 which bypasses the inscribing, printing, and endorsing stations. The high speed path rejoins the primary print path 18 at the entrance to transition station 35. When being operated as a sorter, the transport portions 17, 25, 28 and 35 all operate continuously at the higher speed. When operated as a proof inscriber, documents traverse transport portions 17, 25, 27 and 35 at the higher speed one at a time and traverse the inscribe, print and endorse stations at a slower rate.

In preparation for describing the entire transport and its operation under control of its computer and control logic microprocessors, the more important elements including the read station, and the transition station will be first described. While reading this description of the read and transition stations, it will be well to keep FIG. 2 in mind so as to be aware of their position in the machine.

Figure 3:
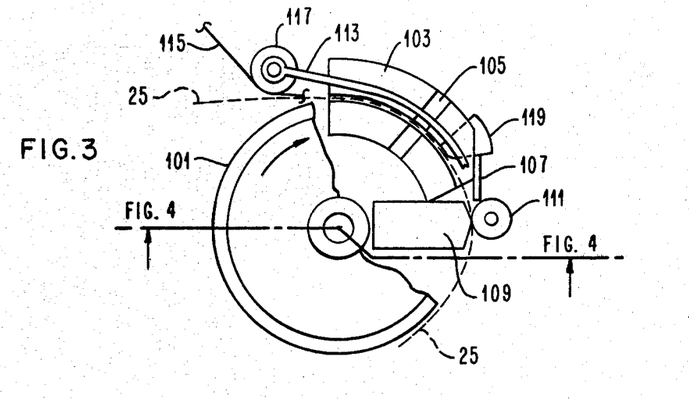
FIG. 3 is a detail top view of the read station.

Referring then to FIG. 3, a cutaway view of the read station is shown. Documents enter the read station from the left along the path indicated by dotted line 25. The document is closed between belt 115 and read drum 101 and carried through the slot in guide 103. The top portion of the document is held against read drum 101 by belt 115 with the bottom portion of the document free to traverse the slot in guide 103. While traversing guide 103, permanent magnets 105 magnetize the magnetic material in the ink. After passing magnets 105, the document enters the space between read head 109 and pressure roll 111. Metal guide finger 107 facilitates entry of the document into read position. As the document moves past read head 109, electrical signals are read while pressure roll 111 rotates, keeping the document in contact with the read head. While the document is passing read head 109, guide 113 prevents the top most portion of the document from deforming in an outward direction under centrifugal force.

Figure 4:
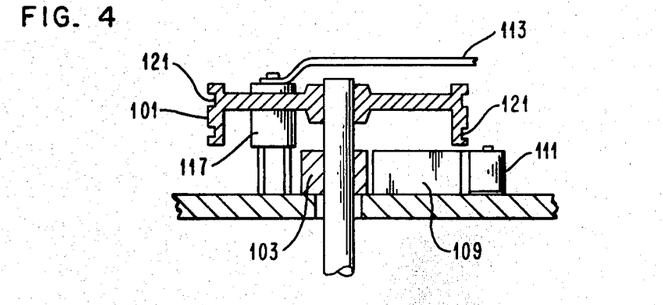
FIG. 4 is a detail elevation view of the read station.

FIG. 4 shows an elevation cross section of FIG. 3 with some parts, such as belt 115, omitted for clarity. An optical sensor 119 is provided preceding the read head. Sensor 119 responds to the change in reflectance which occurs as a document passes through the slot in guide 103. FIG. 4 also shows grooves 121 in read drum 101. Grooves permit fingers on a to-be-described document path selector to efficiently lift the document from the surface of the drum 101.

Figure 5:
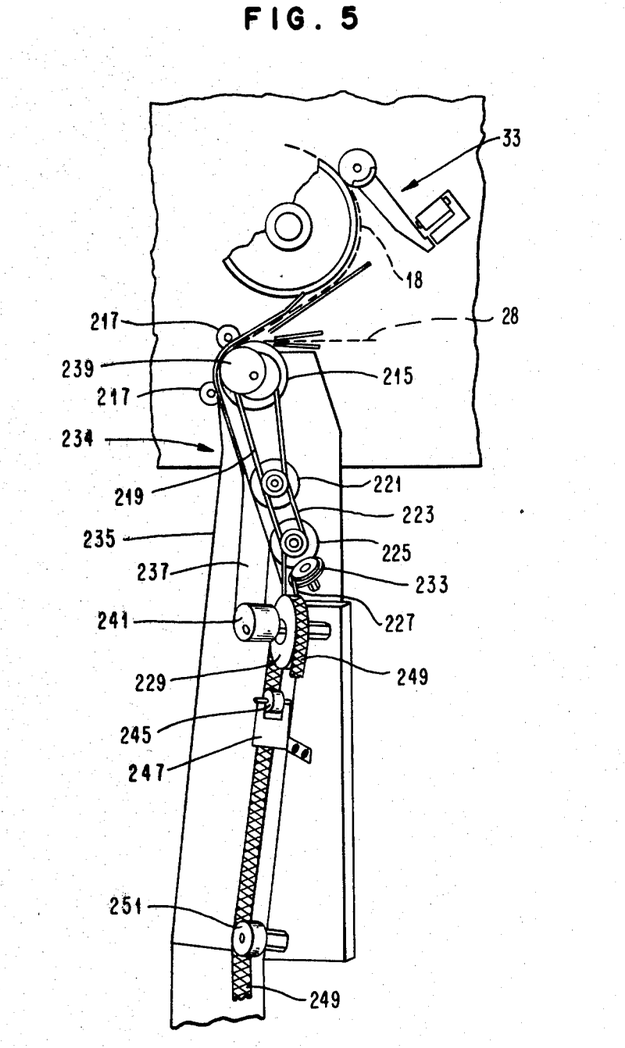
FIG. 5 is a detail plan view of the transition station.

Referring now to FIG. 5, wherein the transition station is shown, the functionally important parts for rotating the document into a near horizontal plane will be described. Documents enter the transition station from two paths indicated by dotted lines 18 and 28. Low speed path 18 includes documents which have been inscribed, printed and/or endorsed, whereas sort path 28 is the high speed path directly from the read station 27. While in path 18 or 28, documents are being driven by motors in the main transport. Upon entering the transition station and being closed between main roll 215 and aligning pressure rolls 217, the document is thereafter driven under control of a motor in the stacker. Roll 215 is driven by belt 219 from roll 221 which is in turn driven by belt 223 from roll 225. Roll 225 is in turn driven by belt 227 from roll 229, belt 227 being guided by pulley 223. Rolls 221 and 225 also have aligning backup pressure rolls not visible beneath the curved guide plate 235. Rolls 215, 221 and 225 align the bottom edge of the document with the bottom edge of guide plate 235 as the document begins its transition from a vertical orientation to a more horizontal orientation. Alignment is thus advantageously accomplished in combination with transition of the document from vertical to substantially more horizontal orientation and assures smoother motion of the document into the selected stacker pocket.

Figure 8:
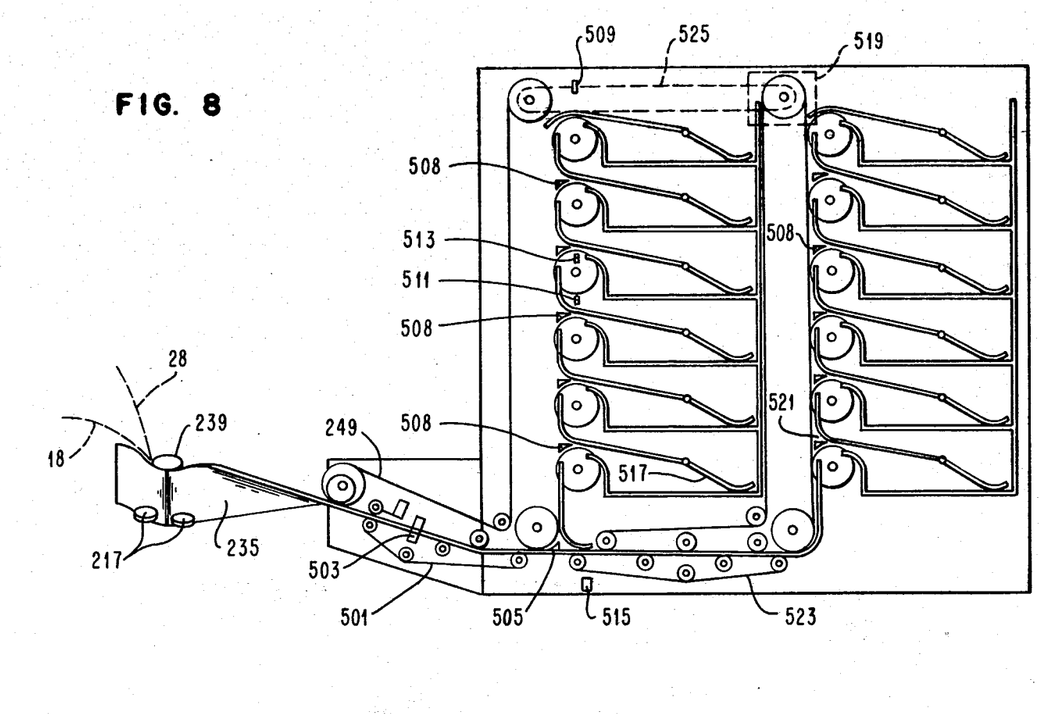
FIG. 8 is a front view of the stackers.

While the document is moving under control of rolls 215, 221 and 225, the top of the document is caused to bend in conformity with the shape of guide plate 235 by plastic tape 237 connected to eccentrics 239 and 241 mounted on the end of the support studs for rolls 215 and 229. Curve 243 in guide plate 235 is a simple curve in an originally flat piece of material, spaced from the curve of roll 215, allowing the paper document to conform to its surface without introducing tearing forces. When the leading edge of the document reaches roll 229, it holds the document in tension so as to assure that alignment affected by rolls 221 and 225 is maintained. After leaving the curved portion 243 of the transition station, the document passes downward along guide plate 235 due to the friction of moving belt 249 caused by normal force of spring material 247 holding roll 245 and belt 249 against a lower belt 501 shown in FIG. 8. Upon reaching roll 251, the document path is changed from a downward direction to a horizontal direction for entry into stacker 21. A front view of the transition station is shown as part of FIG. 8 showing the stacker to which it is attached.

Figure 6A:
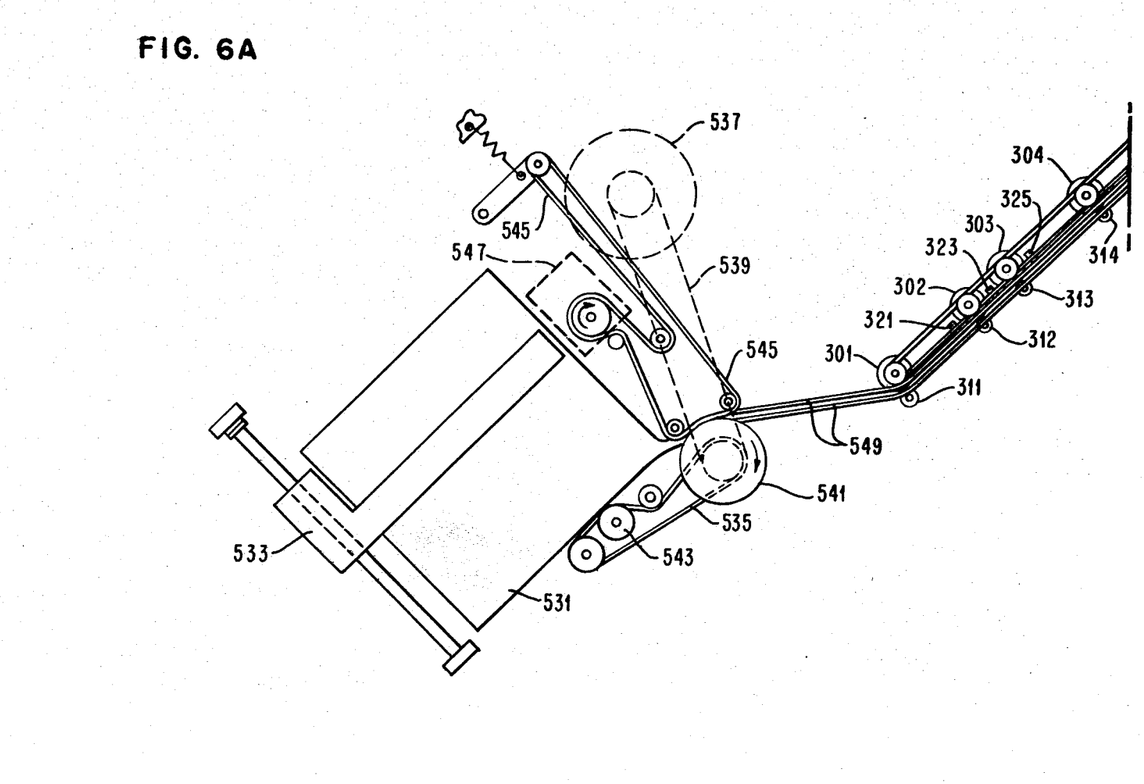
FIG. 6A is a detail top view of the autofeed and manual feed stations.
Figures 6B, 7:
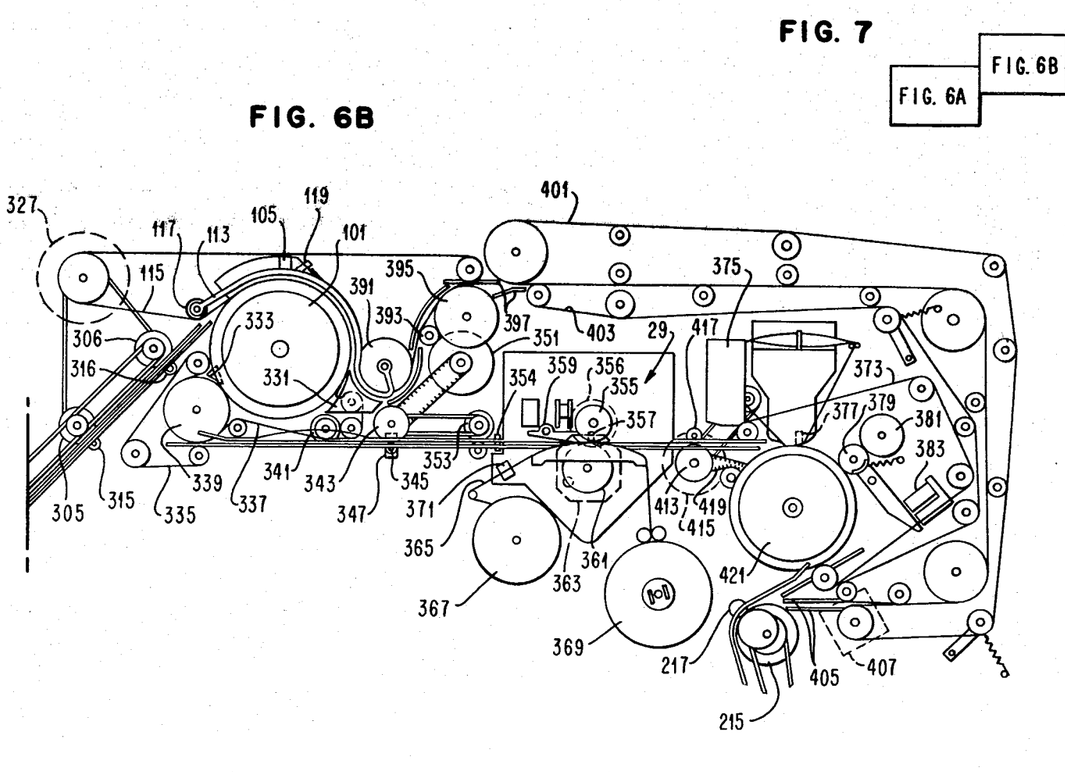

Documents enter the transport through the manual feed station shown in FIGS. 6A and 6B as comprising a plurality of alignment rolls 301 through 306 and corresponding pressure rolls 311 through 316. Pressure rolls 312 and 313 are mounted for actuation by a solenoid. When the solenoid is energized, rolls 312 and 313 are pulled away from alignment rolls 302 and 303 leaving an open gap into which documents can be manually dropped after the information on the document has been entered at the keyboard. Optical sensors 321, 323 and 325 detect whether or not a document has been dropped into the manual feed slot. When the transport control logic detects that any two of sensors 321, 323 and 325 have been interrupted by a document, logic is conditioned to close rolls 312 and 313 upon receipt of an okay to send signal from the inscriber, sequence printer and stacket control logic. Alignment rolls 301 through 316 are belt driven by AC motor 327. The size of rolls 301 through 306 is graduated such that the document is accelerated as it moves from one roll to another and reaches the read station at approximately 150 inches per second. The automatic feed uses the same alignment rolls in the manual feed path. A stack of documents to be processed is placed on edge in the auto feed area 531 and spring loaded follower 533 is allowed to hold the documents firmly against feed belt 535. Feed belt 535 is driven by stepper motor 537 through drive belt 539 and feed wheel 541. In addition to traversing feed wheel 541 and idler pulleys, feed belt 535 traverses eccentric 543. Eccentric 543 moves feed belt 535 in and out against the documents in area 531 to provide a joggling action and facilitate document feeding. To prevent more than one document at a time from entering the alignment station of the manual feed slot, a restrain belt 545 is driven in the opposite direction by AC gear motor 547 at a very slow rate, such as 15 or 20 inches per minute. Feed wheel 541 and the restrain belt 545, by moving in opposite directions, fan out the documents so as to feed one document at a time from the autofeed hopper. Motor 537, being a stepper motor, is under substantially instant control of the transport control logic and therefore can stop document feeding whenever the transport area to the stacker is obstructed with a preceding document. Documents leaving feedwheel 541 are moved between guides 549 and closed between the first alignment roll 301 and its pressure roll 311.

Figure 9:
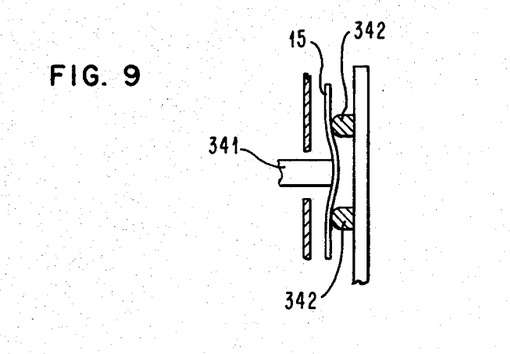
FIG. 9 is a cross section of the hold and view station soft drive.

Referring now to FIG. 6B, the transport will be described in more detail. Recall from FIG. 6A how documents are fed into the read station. At the read station, the document is closed between belt 115, also driven by AC motor 327, and read drum 101. The lower edge of the document passes through guide block 103 to permanent magnets 105 and interrupts optical sensor 119. Sensor 119 informs the transport control logic that a document has arrived at the read station. After passing the read head, the document is deflected by path selector 331, shown in a left-most position deflecting documents to the high speed path. In the event that the document was fed from the autofeed, and is being sorted, path selector 331 would be positioned as shown. In the event that the document was entered manually, path selector 331 would be positioned in a right-most position, allowing the document to continue around read drum 101 until deflector 333 is reached when the document will be deflected outward and closed between belts 335 and 337, travelling around pulley 339. Read drum 101 and pulley 339 cause the document to travel in a serpentine path permitting the hold and view station to be placed substantially in front of the read station, thereby shortening the overall length of the transport. In addition to carrying the document against read drum 101 from path selector 331, belt 337 drives soft drive roll 341 which continues to urge the document all the way into the hold and view station against alignment roll 343 and pressure roll 345. Upon being closed between rolls 343 and 345, the light path in sensor 347 is interrupted and, depending upon conditions having occurred in the read station, the document can be retained in the hold and view station 19 as long as necessary for operator action. Because soft drive roll 341 cups the document between its face and two springs 342, as show in FIG. 9, roll 341 can be driven by AC motor 327 through belt 115, drum 101 and belt 337, without causing substantial scuffing of the document. After registering at sensor 347, the document is again aligned and driven forward by rolls 343 and 353 under control of stepper motor 351 past optical sensor 354 in preparation for inscribing of information entered at the keyboard. Upon reaching inscribe station 29, the light beam of sensor 357 is interrupted and the inscribe control logic is signalled to begin the inscribe operation. As part of the inscribe operation, two additional optical sensors provide hammer position information and print wheel information to the inscribe logic. The optical sensor related to hammer 359 and the sensor related to inscribe font wheel 361 are not specifically shown in view of their being known in the art of print wheel and hammer control. Inscribe font wheel 361 is driven by step motor 363 under control of the inscribe control logic to inscribe the proper sequence of numerical information entered at the keyboard. Document drive roll 355 is indexed by step motor 356 to increment the document to inscribe positions for each character. Motor 356 is located under roll 355 and motor 361. Magnetic ink for the inscribe operation is carried on ribbon 365 from spool 367 and the spent ribbon is wound onto takeup spool 369 by another step motor not shown under takeup spool 369. Still another sensor 371 detects when the ribbon has been exhausted from spool 367, causing interruption of the okay to send line, thereby stopping the transport.

After the information has been inscribed on the face of the document, the document proceeds to the sequence print station and is closed between roll 413 on the shaft of step motor 415 and pressure roll 417. If the stacker control logic is clear, providing the okay to send signal line, the document is driven into closure between platen 421 and belt 373. Platen 421 and belt 373 are also driven by step motor 415 by drive belt 419. Step motor 415 also drives the ribbon takeup wheel associated with ribbon cartridge 375. When the document interrupts the optical path of sensor 377, the print control logic is signalled to begin printing the sequence number on the back of the document for later audit purposes. As the document continues to move around the platen 421, it passes beneath endorser wheel 379 which is separately pulled against the back of the check at the proper time by magnet 383 under control of the print control logic. When in contact with the back of the financial document, the endorser wheel rotates against ink pad wheel 381 and from thence continues to rotate, endorsing the back of the check with the insignia of the financial institution.

After being sequence printed and endorsed, the financial document is released from platen 421 and belt 373. It then enters into the transition station and is closed between roll 215 and 217. The document then proceeds toward the stackers, under control of the stacker motor, as was described with respect to FIG. 5.

In the event that the machine is being operated as a sorter and the inscribe and printing stations are not being used, path selector 331 will be in a leftmost position, deflecting documents away from read drum 101 around roll 391. After traversing roll 391, the document continues in contact with belt 115 and is closed against roll 393 and 395 on its way to guides 397 which direct the document into closure between belts 401 and 403. Belts 401 and 403 traverse the document path, carrying the document closed between them, delivering the document to guides 405 for delivery into closure between rolls 215 and 217. Belt 401 is drive by AC motor 407 and in turn drives belt 403 by friction of contact along the document path.

Although the stackers 21 are in many respects similar to stackers provided on the IBM 1255 reader sorter, the stackers are shown in FIG. 8 so that their relationship to the transition station of FIG. 5 can be more clearly understood. As previously described, documents enter the transition station from low speed path 18 or high speed path 28 and are closed between a drive roll and pressure roll 217. As the document is driven into the transition station, the plastic tape connected between eccentrics 239 and 241 cause the top edge of the document to be folded while the bottom edge is registered for stacking. When the leading edge of the document reaches roll 229, it is driven into closure between belts 249 and belt 501 which carry the document downward toward the first stacker bay. While traversing guide plate 235, the leading edge of the document interrupts the light beam of sensor 503 to signal the presence of a document. Upon reaching solenoid actuated bay selector 505, the document is deflected upward into the first bay of stackers if bay selector 505 is activated by the stacker control logic. Alternately, if bay selector 505 is not active, the document continues straightforward into the second bay. While rising upward in a stacker bay, each document encounters five solenoid actuated pocket selectors 508. When a pocket selector 508 is activated by the control logic, the document is caused to be horizontally deflected around one of the stacker feed wheels 507 and into the selected stacker. While entering the selected stacker, a light beam from light source 509 or 511 to light detector 513 or 515 respectively is interrupted indicating passage of a document. Since light source 509 and light detector 513 monitor the top three stacker pockets while light source 511 and light detector 515 monitor the lower three pockets and the transport path to the second stacker bay, time of arrival must be used by the stacker control logic to distinguish between the pockets into which the document is entering. Upon entering a pocket, the document is deflected downward by hinged guide 517 to form a stack. AC stacker drive motor 519 drives the last stacker bay belts 521 and 523 directly and drives the first stacker bay belts 249 and 501 indirectly through drive belt 525. Any number of stacker bays can be added using the above described means to extend the number of available stacker pockets.

Figure 10:
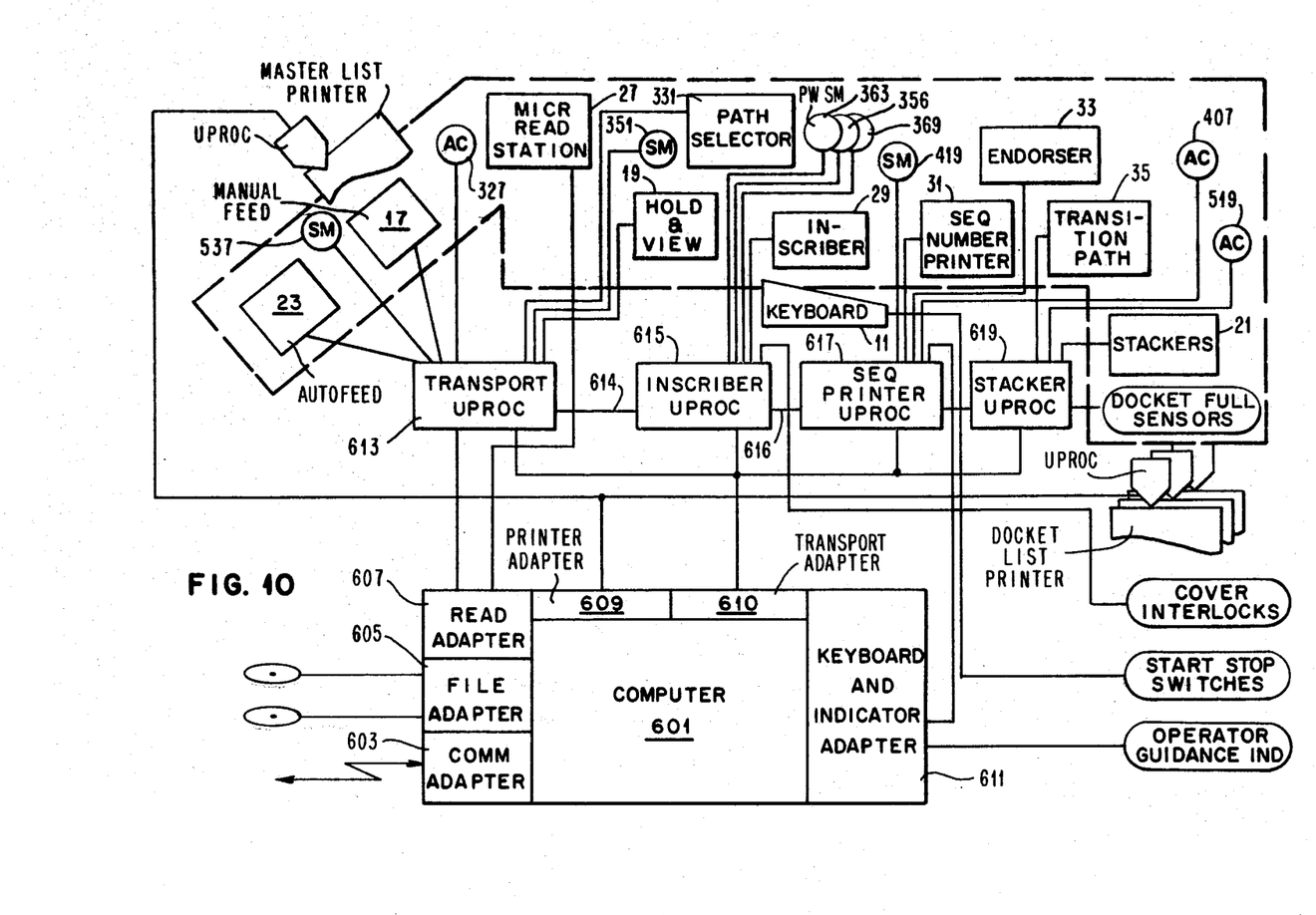
FIG. 10 is a system control diagram showing the controlling computer and microprocessors.

Reference is now made to FIG. 10 wherein a system diagram showing how the novel transport of the invention is controlled. Overall control of the document processor is effected by a microprogrammable computer including memory and a plurality of input-output adapters. Each I/O adapter responds to four I/O commands. They are a write command (hex 04), which is used to transfer a device command to a device or microprocessor; a sense command (hex 01), used to transfer a status byte from a microprocessor or device to computer 601; a read command (hex 02), used to initiate a read operation or to transfer 64 bytes of read write memory data from a microprocessor to computer 601; and an end op command (hex 08), used to terminate any of the above commands.

One or more of the input-output adapters is dedicated to the communication function between the document processor and a host computer. Other adapters such as adapter 605 controls diskette drives for bulk memory. Adapter 607 is the read station adapter which receives data being read from the MICR encoded information near the bottom of the document. Adapters 609 and 610 connect a plurality of single chip control logic microprocessors to the main microcomputer 601. The control logic microprocessors control portions of the transport, and master list and pocket list printers. Adapter 611 provides for data input from the keyboard and for operator guidance indicator control.

Referring now to the control logic microprocessors, each microprocessor operates independently under control of its own program in read only storage to control the hardware to which it is dedicated in exactly the same manner as hard wired and/or logic gates have been used in the past to control the operation of hardware. By way of example, the transport, inscriber, sequence printer and stacker control logic microprocessors will be described in some detail.

Each control logic microprocessor receives command bytes from the main control processor 601 and accumulates status bytes for communication to computer 601. By way of example, the transport microprocessor 613 receives commands to control the autofeed station, the manual feed station, the path selector 331, and the hold and view station. In addition, this microprocessor 613 monitors for jam conditions in the feed, read, and hold and view stations as well as providing the sequence of pulses to control the stepper motors in each of the above stations. In order to accomplish the above functions, the bits of a command byte have been defined as follows: Bit 0, when on, causes microprocessor 613 to clear its read write memory and run the hold and view stepper motor at low speed unless bit 6 is on. Bit 6, when on, causes microprocessor 613 to interrupt drive power to the hold and view stepper motor. This bit may be used to conserve power or to facilitate the task of removing a jam. Under normal conditions the hold and view stepper motor is either running or indexed in a stop position with power on to control the position of a document at the hold and view station. Bit 1 of the transport control logic command causes microprocessor 613 to energize the AC read motor 327. Bit 2, when on, will cause microprocessor 613 to prepare for high speed autofeed operation. The microprocessor will also monitor the okay to send line 614 from the inscriber microprocessor 615 and will deactivate the autofeed and read motors if the okay to send line 614 becomes inactive indicating a downstream document obstruction. Autofeed operation requires that restrain belt drive AC motor 517 operate with the read motor when this bit 2 is active. Bit 3, when on, will cause microprocessor 613 to execute that portion of a read only storage program pertaining to low speed autofeed operation. Detection of documents leaving the hold and view station is used by transport microprocessor 613 to control feeding of a document from the manual feed or autofeed. Bit 4, when on, will cause the transport microprocessor 613 to feed documents if the okay to send line from inscriber microprocessor 615 is active. When command bit 4 is turned off by computer 601, any document in the process of feeding will continue but all future document feeds will be inhibited. Command bit 5, when on, causes microprocessor 613 to load the state of all input sources into specific read write memory locations and transfer 64 bytes of read write memory data to computer 601. This command effectively permits a snapshot of the state of the machine to be sent to computer 601 for diagnostic purposes. Bit 6 has been discussed earlier with respect to bit 0. Bit 7, when on, will cause microprocessor 613 to release the manual feed slot solenoid when two of the manual feed slot sensors 321, 323 and 325 have been interrupted by a document and the okay to send line 614 is active.

Complementing the above described command byte, a status byte permits 8 items of transport status information to be returned to computer 601. Bit 0 indicates a jam in the path between the autofeed and the manual feed stations. This is detected by determining that a document has not arrived at the manual feed station within a specified period of time or that a document remains at the manual feed station in excess of a predetermined period of time. Time is counted by microprocessor 613. Microprocessor 613 turns on bit 1 of the status byte when it detects a jam between the manual feed station and the read station during low speed operations. When operating at high speed, the first document is checked for a jam condition and all remaining documents are checked for maximum interdocument gap, again determined by counting time. Microprocessor 613 turns on status bit 2 whenever it detects a jam between the read station and the hold and view station. Likewise, microprocessor 613 turns on status bit 3 whenever a jam is detected between the hold and view station and the inscribe station. Because the inscribe station is controlled by different microprocessor 615, a jam is detected by sending a document to the inscribe station and not noting the deactivation of the okay to send line within a predetermined time, indicating the arrival of the document at the inscribe station. Status bit 4 is set whenever a command is received to start the read AC motor or the auto feed restrain belt AC motor and the path ahead shows a document is present in the hold and view station for a read operation or in the manual feed station for an autofeed operation. Status bit 5 is turned on by microprocessor 613 whenever it detects a failure to feed by the autofeed. Since a sensor is not provided in the hopper, microprocessor 613 cannot distinguish between an empty hopper and a failure to feed. Microprocessor 613 will turn on status bit 6 whenever the optical path of the sensor in the hold and view station is restored, indicating that a document was physically removed from the hold and view station by an operator. Microprocessor 613 will thereafter permit no further document to be fed from the manual feed or the autofeed until an activate command is received from computer 601. This action allows computer 601 to retain out of sequence information concerning the document being processed. Status bit 7 is turned on whenever the sensor switch connected to path selector 331 does not transfer within a given period of time after the activating solenoid has been energized.

Like the transport control logic embodied as microprocessor 613, the inscriber control logic microprocessor 615 receives commands from computer 601 and provides status to computer 601 although the function of controlling an inscriber is slightly different than the functions relating to transport control. For example, the primary functions of the inscriber control logic are to control the inscribing of documents by controlling the print hammer, and the print wheel, print ribbon, and document control stepper motors at the inscribe station. In addition microprocessor 615 detects and reports jams between the inscriber and sequence number printer or jams at the inscriber. Additionally because memory space was available, the logic for monitoring machine cover interlocks was implemented in microprocessor 615. After receiving a write command from computer 601, the inscriber control logic microprocessor 615 receives one command byte having bits defined as follows:

Bit 0—initialize
Bit 1—read RAM
Bit 2—disable motors
Bit 3—inscribe
Bit 4—simulate hammer failure
Bit 5—simulate print wheel failure
Bit 6—simulate inscriber jam Bit 7—simulate inscriber to sequence printer jam In addition to having the above described definitions when used alone, bits of the command byte can be used in combination to obtain additional commands such as initialize with disable. Initialize with disable will cause the adapter to reset and disable its three stepping motors. The initialize command is terminated by an adapter command. Terminating the initialize with disable command puts the inscriber control logic 615 in high speed path mode where its functions are to monitor machine covers and pass the okay to send signal from the sequence printer control logic 617 to the transport control logic 613. Inscribe control logic 615 will operate in this high speed path mode whenever the machine is being used as a sorter. The initialize without disable command will cause the inscriber control logic 615 to retract the hammer and test the hammer sensor; move the ribbon and test the ribbon sensor; find home position on the print wheel; run the document motor if the okay to send line 616 is active until an all zero command is received; and thereafter test that no document is in the inscriber station. A 00010000 command is the inscribe command and when accompanied by any of bits 4 through 7 will cause an error to be simulated. If bits 4 through 7 are not present, inscriber control logic 615 takes the following byte as a length count indicating the number of significant characters to be inscribed and the following characters as data to be inscribed. An all zero command byte or a command byte with only bit 2 on is a terminate command to terminate initialization and allow the microprocessor 615 to stop the document movement stepper motor when the transport has been cleared.

Complementing the command byte, a status byte is also defined for inscriber control logic microprocessor 615. Status byte bits are defined as follows:
 Bit 0—inscriber to sequence printer station jam p1 Bit 1—inscriber jam
 Bit 2—hammer failure
 Bit 3—print wheel failure
 Bit 4—ribbon failure
 Bit 5—document sent to printer
 Bit 6—cover change
 Bit 7—cover open check
Bits 6 and 7 are both set to a binary 1 when the first cover is opened and bit 6 is a 1 and bit 7 a 0 when the last cover is closed.

When a document reaches the inscribe station sensor 357, a time out is initialized to allow the document to reach the document drive wheel 355. After the time out, the document will be moved one character position to register it for inscribing. When the document is registered, the inscriber control logic microprocessor 615 will drop its okay to send line 614 to transport logic 613 and fetch the first character to be inscribed from the inscribe buffer. If the print wheel character opposite the hammer does not match the character fetched, a print wheel search will be initiated. When the print wheel search is complete, the hammer will be fired to inscribe the first character. When the return of the hammer is sensed, the next character will be fetched and the document, ribbon, and print wheel motors will be moved concurrently. When all motors have stopped, the hammer will be fired again and the cycle repeated until the buffer is empty. If the character fetched is decoded as a space, the document will be moved one character position without inscribing.

When the last character has been inscribed, the document will be ejected from the inscribe station if the sequence number control logic microprocessor 617 is ready to accept a new document. Inscriber logic 615 will then start the document motor 356 and begin counting time as a jam timer. If only the amount field was inscribed, the document will be ejected at high speed for the first $3\frac{1}{4}$ inches and low speed for the remainder of the length of the document. When the document trailing edge is approximately one inch beyond the hold and view to inscriber sensor, control logic 615 will raise its okay to send line 614 to the transport control logic 613 indicating that the inscriber can accept the next document.

In a similar manner the sequence number printer control logic 617 accepts print and endorse commands from computer 601 and sends a status byte when a read status is required. Also because memory space was conveniently available in this control logic microprocessor, the control logic responsive to the start and stop push buttons for the autofeed and transport have been implemented in control logic 617. Microprocessor 617 is responsive to two command bytes and provides one status byte. Bits of the first command byte have the following meanings:
 Bit 0—initialize
 Bit 1—optional data
 Bit 2—run high speed path motor
 Bit 3—activate sequence number printer
 Bit 4—activate endorser
 Bit 5—read RAM
 Bit 6—disable stepper motor
 Bit 7—activate sequence printer stepper motor
 Bits 0 through 3 and 6 of the second command byte are spare and not used.
 Bit 4—controls sequence/endorse locations
 Bit 5—simulates inscriber to sequence number printer jams
 Bit 7—simulates transition sensor jam
Many of the bits of the command bytes cause a sequence of events to occur as was described earlier with respect to the transport microprocessor 613. For example, when bit 2 is on, microprocessor 617 will energize the high speed path AC motor. The microprocessor 617 will also detect jams in the read to transition path and monitor the okay to send line from the stacker microprocessor 619. If either the okay to send line 618 from the stacker microprocessor 619 becomes inactive or a jam in the read to the transition path occurs, microprocessor 617 will force its okay to send line 616 to the inscriber microprocessor 615 to an inactive state. When this bit 2 is off, the high speed path AC motor is de-energized and the stepper motor is activated. Microprocessor 617 will then check for jams from the sequence number print station to the transition sensor 503 while also monitoring the okay to send line from the stacker microprocessor 619.

Likewise bit 3 activates the sequence number printer and if this bit is a binary 1, microprocessor 617 will print all of the data that is present in the print buffer when the document has reached the sequence number print station. If bit 4 of command byte 2 is a binary 1, the sequence number and endorsement will be printed near the trailing edge of the document. Otherwise printing will occur near the leading edge. If bit 1 of command byte 1 is a binary 1, microprocessor 617 will place the following seven bytes into an optional thirteen character data field of the print buffer. The data will be positioned to the right of the normal date/sequence number if leading edge position is specified by bit 4 of command byte 2. This same optional data will continue to be printed on each document until the optional data field is cleared by a second optional data command issued by computer 601.

The status byte provided by microprocessor 617 has the following bit definitions:

Bit 0—indicates a jam detected between the read sensor and the transition sensor while the high speed path AC motor is on
Bit 1—start push button depressed
Bit 2—stop autofeed push button depressed
Bit 3—stop transport push button depressed
Bit 4—jam detected at sequence printer by document arriving but failing to leave in time
Bits 5 through 7 are spare.

The stacker control logic microprocessor 619 guides documents to the correct pocket and monitors for jams in the stacker as well as detecting pocket full conditions and monitoring for the arrival at a correct pocket by counting time as previously described with respect to FIG. 8. Like the other microprocessors which have been described, stacker control logic microprocessor 619 is responsive to a device command byte and provides a device status byte to computer 601. The bits of the device command byte are defined as follows:

Bit 0—initialize
Bit 1—activate stacker motor
Bit 2—simulate pocket select failure
Bit 3—simulate bay select failure
Bit 4—reset initialize sensors
Bit 5—read RAM
Bits 6 and 7 are spares.

A stacker selection buffer is provided for storing a plurality of stacker select addresses. The high order for bits of each stacker select address namely 16, 32, 64 and 128, each identify one stacker bay. The low order four bits are used to identify each pocket 1 through 6 of each bay. If additional stacker modules are added, the stacker select address byte must of course be expanded to two or more bytes. Stacker pocket select addresses are retrieved from the stacker select buffer in sequence as they were loaded by computer 601 as each document is sensed at sensor 503 of FIG. 8.

Complementing the command byte from computer 601, a status byte to computer 601 has bits defined as follows:

Bit 0—late pocket select
Bit 1—pocket full
Bit 2—jam at pocket or bay
Bit 3—wrong bay or pocket
Bit 4—ready
Bit 5—stackers inoperable The late pocket select bit is set by microprocessor 619 when a document reaches transition sensor 503 and no stacker select address bytes are present within the stacker selection buffer. The document will be sent to the reject pocket, which is the top pocket of the first bay. This top pocket requires no active stacker selection. Bits 1, 2 and 3, indicating pocket full, jam or wrong pocket, will cause two bytes to be sent to computer 601 when a sense command is received by transport adapter 610 and forwarded to stacker microprocessor 619. The first byte is the status byte being defined and the second byte is the stacker select address byte for the affected pocket or bay. The ready bit 4 is set by microprocessor 619 when a document crosses the transition sensor 503 and a stacker address is available in the stacker select buffer for the document. This bit, when read by the computer 601, allows the control program in computer 601 to release the identification byte for this item from its document control data block. Ready is a signal to computer 601 in distinction from the okay to send line 618 to upstream control logic microprocessors. The last bit 5, indicating stackers inoperable, is set when the AC motor is running but emitter pulses are not being detected.

The preceding description of the command and status bytes for control logic microprocessors 613 through 619 are exemplary of the command and status bytes for the remaining microprocessors shown in FIG. 10 which control the master list printer and the pocket list printers. Likewise the operator guidance indicators are controlled by keyboard and indicator adapter 611 directly in response to device commands from the financial institutions program operating in computer 601.

Having described a detailed preferred embodiment of the improved multi-functional financial document processor, and having described its operation in conjunction with definition of command and status bytes pertinent to the control logic microprocessor, it is to be understood that the invention is not to be limited to the precise constructions herein disclosed and right is reserved to all changes and modifications coming within the scope of the invention as defined by the following claims.

We claim:

1. A multi-function document processor comprising:
a keyboard,
a document feed station substantially at the left of said keyboard;
a stacker substantially at the right of an operator seated before said keyboard and oriented at substantially 90 degrees in the horizontal plane with respect to a row of keys of said keyboard;
a document path from said feed station to a read station, said read station being located substantially behind said keyboard;
a print document path from said read station through a hold and view station positioned substantially between said read station and said keyboard;
a print station in said print document path between said hold and view station and said stacker; and
a sort document path between said read station and said stacker.

2. The document processor of claim 1 wherein said document feed station further comprises a manual feed slot including a plurality of retractable rolls, said manual feed slot being oriented at substantially forty five degrees in the horizontal plane with respect to a row of keys of said keyboard; and
an autofeed for automatically feeding a plurality of documents in sequence, one at a time, into the end of said manual feed slot.

3. The document processor of claim 1 wherein said read station further comprises:
drum and belt means for carrying a document in face-in orientation past a read head mounted under said drum means to read said document while said drum simultaneously changes the direction of travel of said document at least 180 degrees.

4. The document processor of claim 3 further comprising:
deflector means for deflecting said documents from the surface of said drum to pulley means for changing the direction of travel of said document substantially 180 degrees to define a serpentine path allowing said document hold and view station to be located substantially between said read station and said keyboard.

5. The document processor of claim 4 wherein said print station further comprises:
   rotary platen means carrying said document in a face-in orientation;
   sequence print means at the periphery of said platen means for printing sequence numbers on the back of said document;
   endorser means positioned adjacent to said sequence printer for endorsing the back of said document;
   said rotary platen means changing the direction of travel of said document substantially 90 degrees simultaneous with the printing and endorsing of said document.

6. The document processor of claim 3, further comprising document path selection means for deflecting a document from the surface of said drum after having been read, and directing said document to said sort document path.

7. A multi function document processor comprising:
   a keyboard having horizontal rows of keys, the back rows of keys being raised with respect to the front rows of keys;
   a document feed station substantially at the left of the keyboard said feed station including a manual feed slot oriented substantially forty five degrees in the horizontal plane with respect to a row of keys of said keyboard, said feed slot receiving documents substantially on edge in a vertical plane, one at a time from an operator seated before said keyboard;
   a stacker substantially at the right of said operator seated before said keyboard and oriented at substantially 90 degrees in the horizontal plane with respect to a row of keys of said keyboard;
   a document path for transporting said documents on edge from said feed station through a hold and view station, located substantially behind said keyboard, to said stacker;
   a transition station in said document path, following said hold and view station, for changing the orientation of said documents being processed from a substantially vertical plane into a substantially more horizontal plane for stacking one on top of the other in an array of columns and rows of stacker pockets, permitting more pockets within arms length reach of the operator.

8. The document processor of claim 7, wherein said transition station further comprises:
   alignment rolls for aligning the bottom edge of said document with a guide plate to facilitate later stacking of said documents being processed; and
   a flexible tape member held in position above the top portion of said document, causing the top portion of said document to fold in conformity with a guide plate of said transition path causing said document to move from a substantially vertical plane to a substantially more horizontal plane.

* * * * *